US012011409B1

(12) United States Patent
Wang

(10) Patent No.: US 12,011,409 B1
(45) Date of Patent: Jun. 18, 2024

(54) STIMULATION DEVICE

(71) Applicants: Dongguan Mimao Electronic Technology Co., Ltd., Guangdong (CN); Shenzhen Zhonghongtian Technology Co., Ltd., Shenzhen (CN)

(72) Inventor: Qinling Wang, Guangdong (CN)

(73) Assignees: Dongguan Mimao Electronic Technology Co., Ltd., Dongguan (CN); Shenzhen Zhonghongtian Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/516,986

(22) Filed: Nov. 22, 2023

(51) Int. Cl.
*A61H 19/00* (2006.01)

(52) U.S. Cl.
CPC ............. *A61H 19/34* (2013.01); *A61H 19/44* (2013.01); *A61H 2201/1676* (2013.01)

(58) Field of Classification Search
CPC ........ A61H 19/00; A61H 19/30; A61H 19/32; A61H 19/34
See application file for complete search history.

(56) References Cited

U.S. PATENT DOCUMENTS

| | | | | |
|---|---|---|---|---|
| 9,138,373 | B2 * | 9/2015 | Caropelo | A61H 19/30 |
| 11,389,374 | B1 * | 7/2022 | He | A61H 23/006 |
| 11,491,075 | B2 * | 11/2022 | Fuster | A61H 7/004 |
| 11,554,073 | B1 * | 1/2023 | Guo | A61H 7/005 |
| 2017/0156972 | A1 * | 6/2017 | Sedic | A61H 19/34 |
| 2019/0301501 | A1 * | 10/2019 | Zhu | F16H 57/032 |
| 2022/0296459 | A1 * | 9/2022 | Jin | A61H 19/34 |
| 2022/0354734 | A1 * | 11/2022 | Brooks | A61H 23/0254 |

* cited by examiner

*Primary Examiner* — LaToya M Louis

(57) ABSTRACT

A stimulation device includes a rotary member, a fixing member, a sliding member and a swinging unit. The rotary member defines a first groove therein, wherein the first groove is annular and non-circular. The fixing member defines a second groove therein, wherein the second groove is linear-shaped. The sliding member includes a first sliding portion being slidably engaged into the first groove and a second sliding portion being slidably engaged into the second groove. The swinging unit includes at least one swinging bar being rotatably connected to the sliding member.

20 Claims, 18 Drawing Sheets

STIMULATION DEVICE

TECHNICAL FIELD

The present application relates to the technical field of adult products, and in particular to a stimulation device.

BACKGROUND

In recent years, adult sex products are developed to help the users to release their sex pressure. Generally, an existing adult product uses a vibration motor to provide vibration to the user's sensitive areas, such as the female genitalia, the male genitalia and the like, which has poor stimulation effects and is therefore difficult to meet users' needs.

SUMMARY

An object of the present application is to provide a stimulation device which can provide better stimulation effects, thereby improving the sexual experience.

In order to achieve the above object, a technical solution of the present application provides a stimulation device, including:

- a rotary member defining a first groove therein, wherein the first groove is annular and non-circular;
- a fixing member defining a second groove therein, wherein the second groove is linear-shaped,
- a sliding member including a first sliding portion being slidably engaged into the first groove and a second sliding portion being slidably engaged into the second groove, and
- a swinging unit including at least one swinging bar being rotatably connected to the sliding member.

Compared with the prior art, the stimulation device according to the embodiments of this application can produce an occlusion action to a part of the human body put between the stimulation portions, or slap a part of the human body placed around the stimulation portion, thereby obtaining better stimulation effects.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIG. 1 to FIG. 4, a stimulation device 100 according an embodiment of the present application is shown. In this embodiment, the stimulation device 100 includes a shell 20 and first and second stimulation modules 30, 40 mounted in the shell 20.

Figure 1:
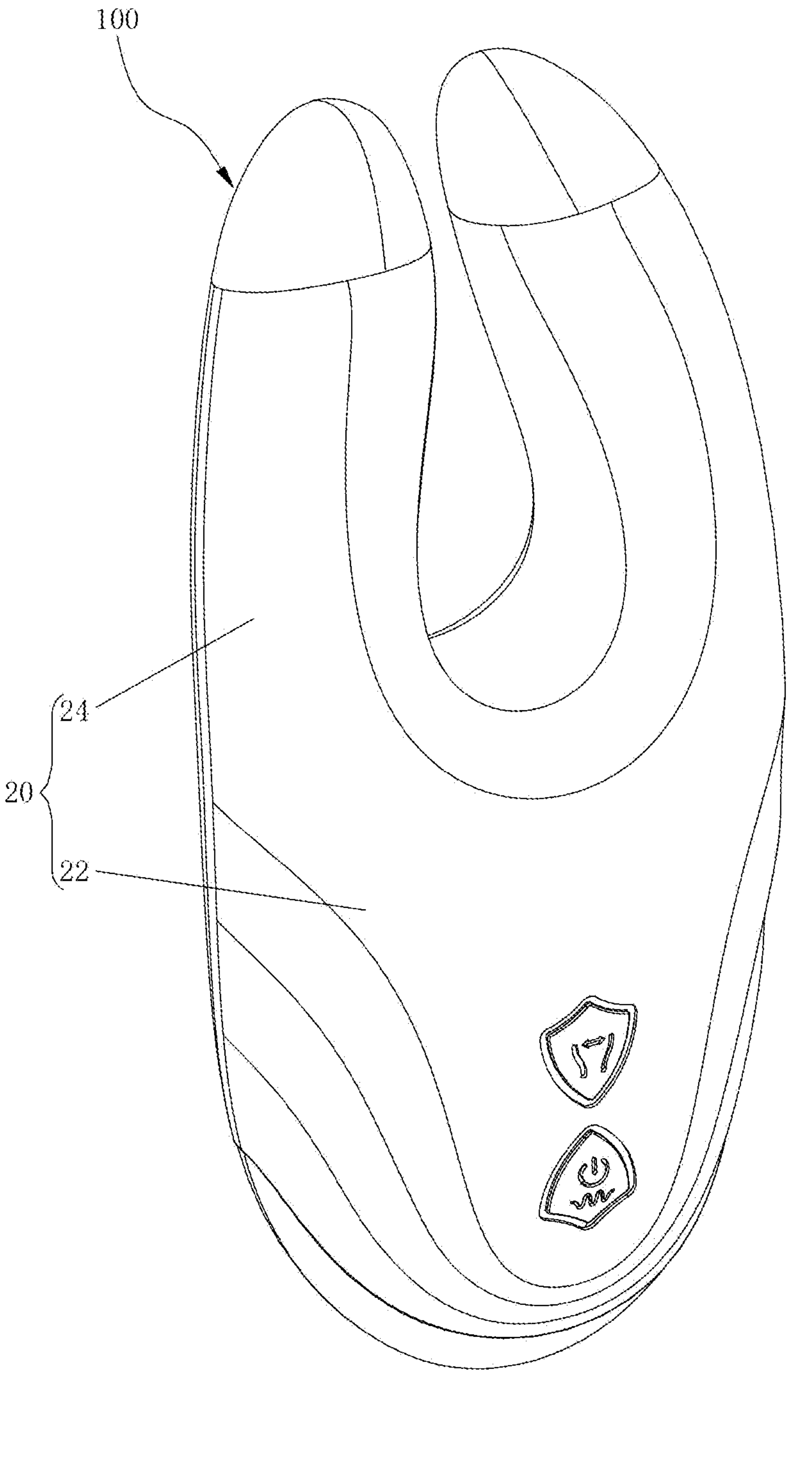
FIG. 1 is an isometric, assembled view of a stimulation device according to a first embodiment of the present application.
Figure 2:
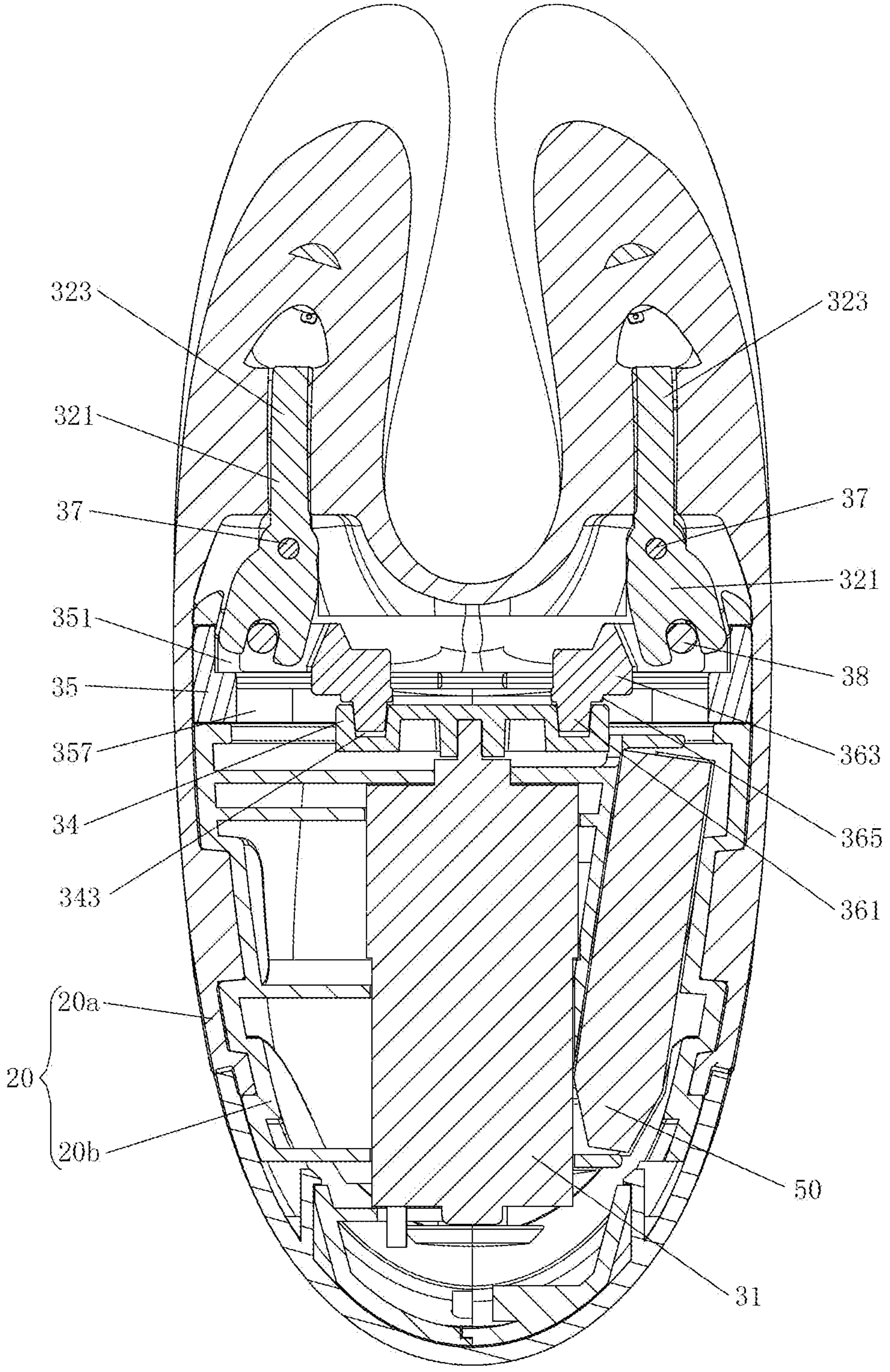
FIG. 2 is a cross sectional view of the stimulation device of FIG. 1.

As shown in FIG. 1 and FIG. 2, the shell 20 includes a main portion 22 and two stimulation portions 24 extending out from the main portion 22. Preferably, the shell 20 is a double-layer structure, and includes an outer shell 20*a* and an inner shell 20*b* inside the outer shell 20*a*. The inner shell 20*b* may be made of hard materials, such as plastic, metal and etc., providing support to the stimulation modules 30, 40 mounted inside the shell 20; and the outer shell 20*a* may be made of soft materials, such as silicone, rubber and etc., for directly contacting a part of the human body which needs to be stimulated, thereby the stimulation device 100 in whole has high strength and comfortable use experience.

Figure 4:
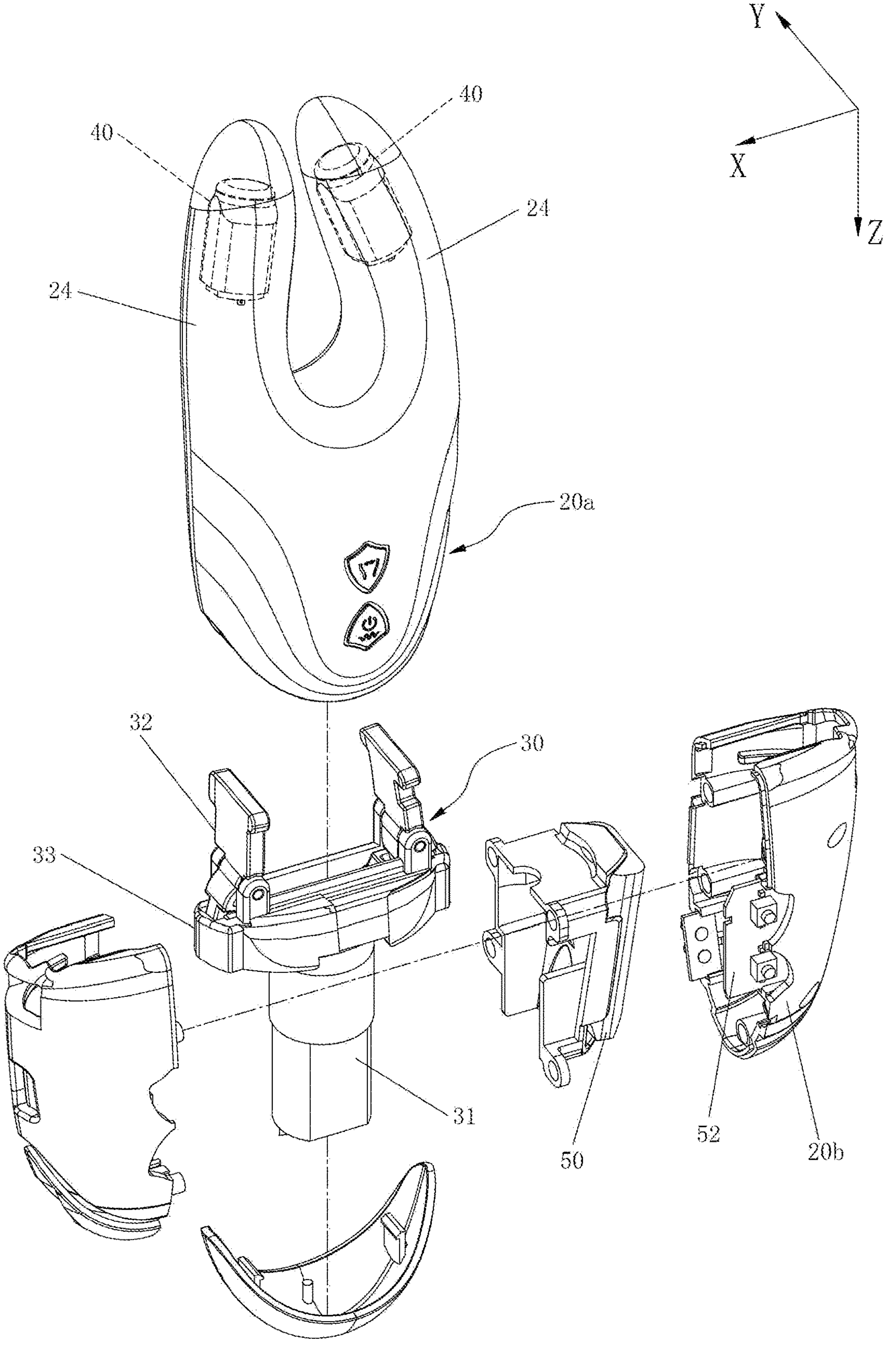
FIG. 4 is an isometric, exploded view of the stimulation device of FIG. 1.
Figure 5:
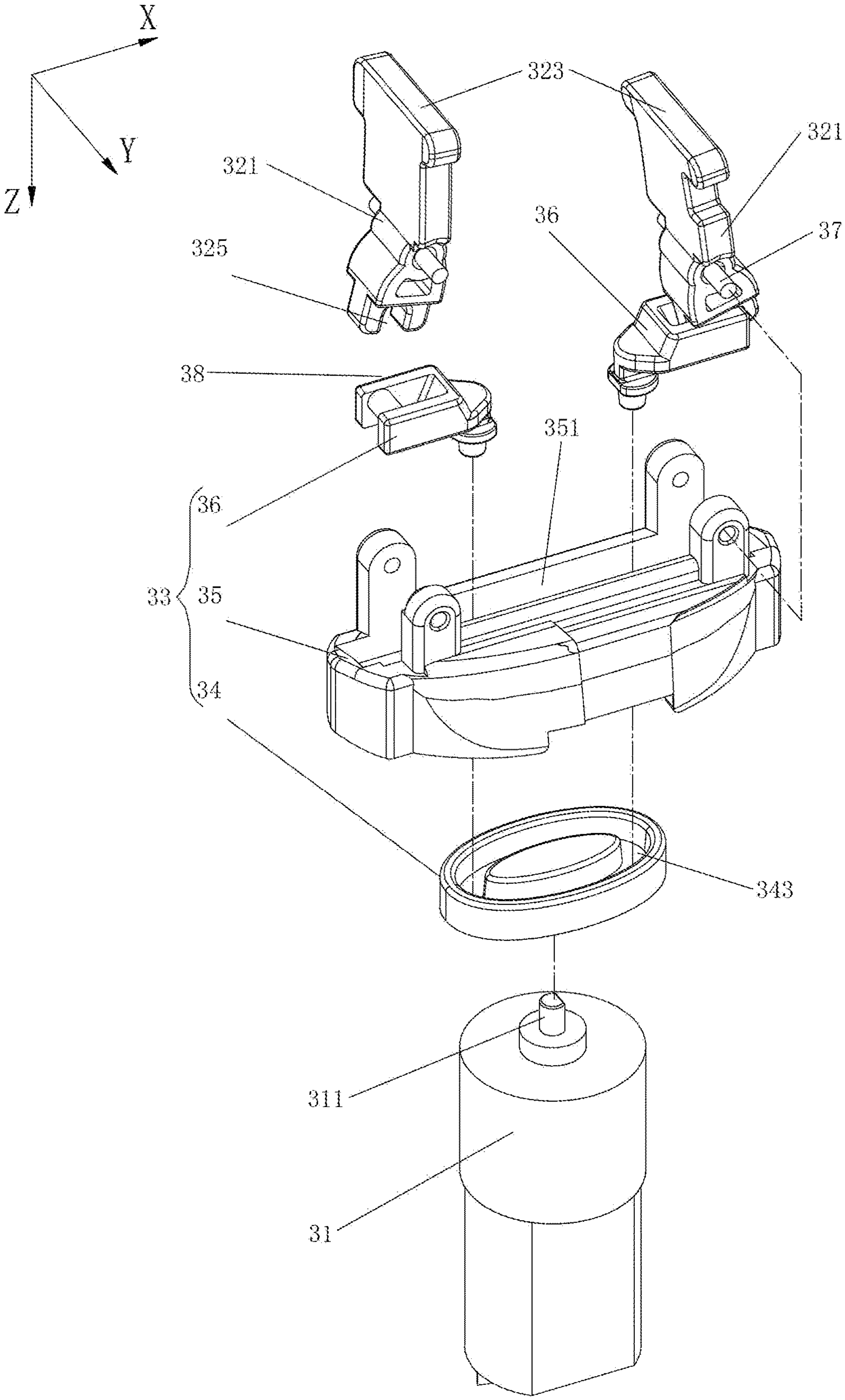
FIG. 5 is a further exploded view of a first stimulation module of the stimulation device of FIG. 4.
Figure 6:
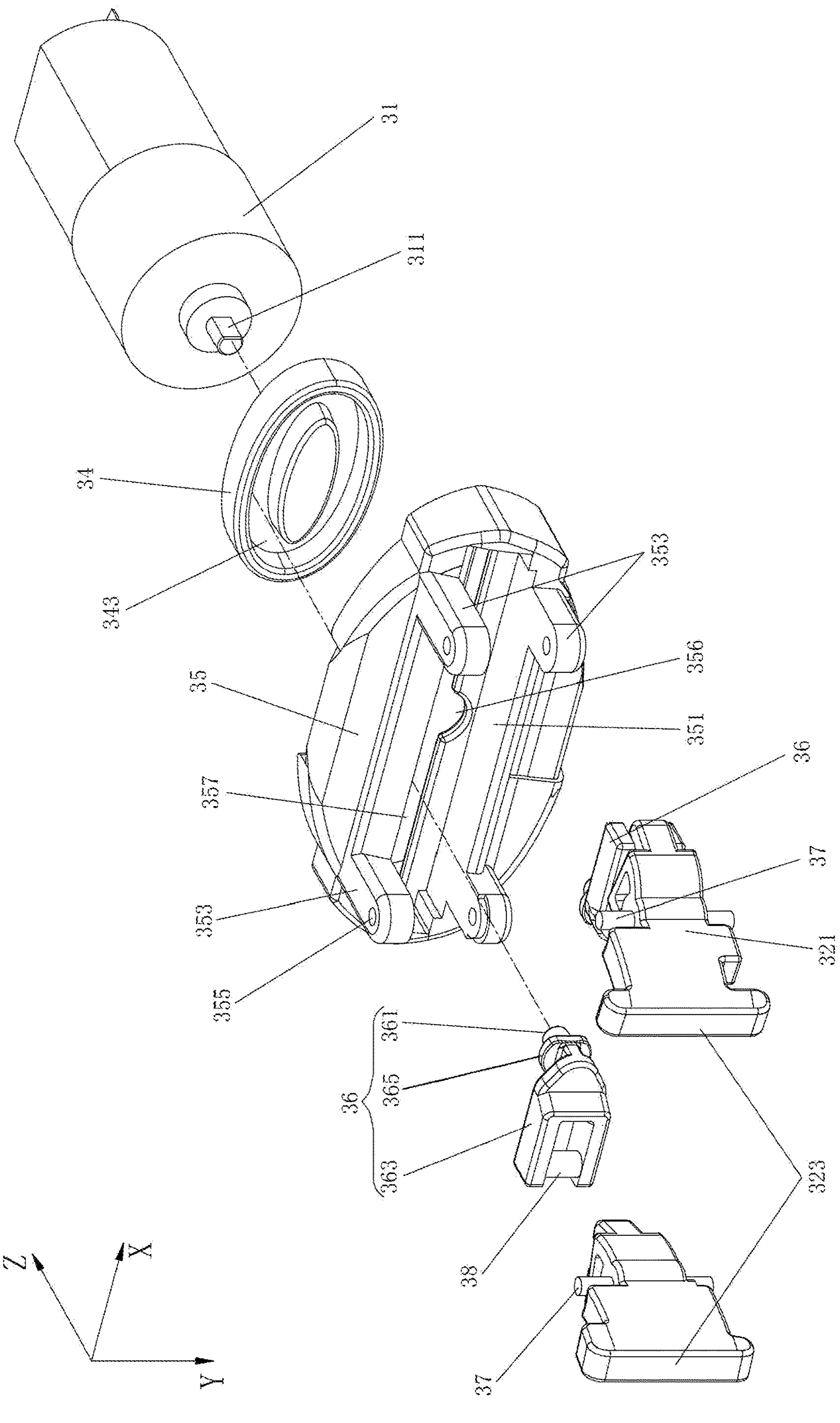
FIG. 6 shows the first stimulation module of FIG. 5 from another aspect.

Referring to FIGS. 4-6, the first stimulation module 30 is generally mounted in the main portion 22 of the shell 20, and includes a first motor 31, a swinging unit 32 and a transmission unit 33 connected between the first motor 31 and the swinging unit 32 in a transmission way. In this embodiment, the first motor 31 is a rotary motor, and has a rotary shaft 311 extending out for outputting torque. The transmission unit 33 is configured for converting rotation of the first motor 31 into linear reciprocating motion in a first direction, such as in X-direction, and in turn driving the swinging unit 32 to swing about an axis extending in a second direction, such as in Y-direction.

In this embodiment, the transmission unit 33 includes a rotary member 34, a fixing member 35 and two sliding members 36.

The rotary member 34 is connected to the rotary shaft 311 of the first motor 31 at a central portion thereof, so as to rotate along with the rotary shaft 311. In this embodiment, a cross section of the rotary shaft 311 is generally non-circular shaped, such as D-shaped, polygonal-shaped, irregularly shaped and etc. The rotary member 34 defines a central hole 341 at the central portion thereof for receiving the rotary shaft 311, which has a shape matching with that of the rotary shaft 311. After inserting of the rotary shaft 311 into the central hole 341, a relative rotation between the rotary member 34 and the first motor 31 is limited for shape matching.

A first groove 343 is defined in the rotary member 34 at a side thereof facing towards the sliding members 36. The first groove 343 is generally non-circular shaped, and in this embodiment, is elliptical-shaped. Specifically, the rotary shaft 311 extends in a third direction, such as in Z-direction; and the first groove 343 is formed in a plane perpendicular to the rotary shaft 311, such as in XY plane. The first groove 343 is symmetric about a rotary axis of the rotary member 34 which is, preferably collinear with that of the rotary shaft 311. During operation of first motor 31, the rotary member 34 rotates together with the rotary shaft 311 in the XY plane, and a position of the first groove 343 in the XY plane is changed periodically.

The fixing member 35 is fixed inside the shell 20, and a second groove 351 is defined in the fixing member 35 at a side thereof facing towards the sliding members 36. The second groove 351 is linear-shaped and elongated in a radial direction of the first groove 343. In this embodiment, the second groove 351 extends along the X-direction, and is configured that relative movement of the sliding members 36 to the fixing member 35 in the X-direction is allowed, and relative movement of the sliding members 36 to the fixing member 35 in the Y-direction is not allowed.

The two sliding members 36 are arranged symmetric to each other in the X-direction. Each of the sliding members 36 includes a first sliding portion 361 engaged into the first groove 343 of the rotary member 34 and a second sliding portion 363 engaged into the second groove 351 of the fixing member 35. The first sliding portion 361 may slide along the first groove 343 to generate movement relative to the rotary member 34, and the second sliding portion 363 may slide along the second groove 351 to generate movement relative to the fixing member 35.

During rotation of the rotary member 34 along with the first motor 31, the first sliding portions 361 of the sliding members 36 engaged into the first groove 343 of the rotary member 34 have a tendency to move in both of the X-direction and the Y-direction. However, the second sliding portions 363 of the sliding members 36 engaged into the second groove 351 of the fixing member 35 limit the movement of the sliding members 36 in the Y-direction. Thus, the sliding members 36 are merely able to do linear reciprocating motion in the X-direction, and a relative movement between the sliding members 36 and the rotary member 34 in the Y-direction is generated since the elliptical-shaped first groove 343 of the rotary member 34 allows generating such motion.

Taking the shell 20 as reference, the rotary member 34 generates movement in both the X-direction and Y-direction, the fixing member 35 keeps still, and the sliding members 36 generate movement in the X-direction. Relative movement in the Y-direction is generated between the sliding members 36 and the rotary member 34, and relative movement in the X-direction is generated between the sliding members 36 and the fixing member 35. Finally, rotation of the first motor 31 is converted into liner reciprocating motion of the sliding members 36 in the X-direction. For the symmetrical construction of the two sliding members 36 in the X-direction, they move towards each other or away from each other.

Referring to FIG. 5 and FIG. 6, the swinging unit 32 includes two swinging bars 321 being arranged substantially symmetric to each other in the X-direction. Each of the two swinging bars 321 is rotatably connected to the fixing member 35 by a first pivot 37 which extends along the Y-direction. In this embodiment, the fixing member 35 is formed separately and then fixedly assembled into the inner shell 20*b*. In other embodiments, the fixing member 35 may be integrally formed with the inner shell 20*b* as one piece. That is, the fixing member 35 may be regarded as a portion of the inner shell 20*b*, and the swinging bars 321 may be rotatably connected to the inner shell 20*b* by the first pivots 37.

In this embodiment, the fixing member 35 forms a pair of support arms 353 at each end of the second groove 351 for connecting the swinging bar 321. Each pair of support arms 353 are respectively located at two opposite lateral sides of the corresponding end of the second groove 351, and define connecting holes 355 therein. Two ends of the first pivot 37 are inserted into the connecting holes 355 of the corresponding pair of the support arms 353, respectively. The first pivot 37 may be formed separately and then assembled to the swinging bar 321 and the support arms 353, or may be integrally formed with the swinging bar 321 or the support arms 353.

Each swinging bar 321 cooperates with one of the two sliding members 36. Specifically, one end of the swinging bar 321 is rotatably connected to a corresponding sliding member 36 by a second pivot 38 which extends along the Y-direction, and another end of the swinging bar 321 is configured as a stimulation end 323 and extends into one of the stimulation portions 24 of the shell 20. The stimulation ends 323 of the two swinging bars 321 are opposite to each other in the X-direction, and swing towards or away from each other during linear reciprocating motion of the sliding members 36.

Specifically, when the two sliding members 36 are driven to do linear reciprocating motion in the X-direction, each of the two swinging bars 321 is forced to swing about the first pivot 37 which extends along the Y-direction, wherein swinging directions of the two swinging bars 321 are opposite. When the sliding members 36 move towards each other, the stimulation ends 323 of the two swinging bars 321 swing away from each other; and when the sliding members 36 move away from each other, the stimulation ends 323 swing towards each other. The two stimulation portions 24 of the shell 20 swing together with the two stimulation ends 323 of the first stimulation module 30, so as to produce an occlusion action to a part of the human body put between the stimulation portions 24, or slap a part of the human body placed around the stimulation portions 24, thereby obtaining better stimulation effects.

In this embodiment, a third groove 357 is defined in the fixing member 35 for engagement of the first sliding portion 361 of the sliding member 36 into the first groove 343 of the rotary member 34. As shown in FIG. 6, the third groove 357 extends through a portion of the fixing member 35 at a bottom of the second groove 351, and has a width in the Y-direction less than that of the second groove 351. When the second sliding portion 363 is mounted into the second groove 351, the first sliding portion 361 extends through the third groove 357 into the sliding groove of the rotary member 34.

In this embodiment, the first sliding portion 361 of the sliding member 36 is generally column-shaped, which extends along the Z-direction and has a diameter slightly less than widths of the first groove 343 and the third groove 357 in the Y-direction, thereby the first sliding portion 361 can slide along the first groove 343 and the third groove 357 smoothly. The second sliding portion 363 of the sliding member 36 is generally block-shaped, and has a width in the Y-direction being slightly less that of the second groove 351 but greater than that of the third groove 357, thereby the second sliding portion 363 can slide along the second groove 351 smoothly.

In this embodiment, a position portion 365 extends radially and outwardly from an end of the first sliding portion 361 adjacent to the second sliding portion 363. The position portion 365 has a width in the Y-direction greater than that of the third groove 357. After assembled, the position portion 365 and the second sliding portion 363 are located at opposite sides of the third groove 357, and thus the sliding member 36 is positioned in the Z-direction. For facilitating assembly of the sliding members 36 to the fixing member 35, a through hole 356 is defined in the fixing member 35 with a diameter greater than the width of the position portion 365 in the Y-direction. Preferably, the through hole 356 is formed at a middle of the third groove 357.

In this embodiment, the first sliding portion 361 of the sliding member 36 is formed at a side of the second sliding portion 363 adjacent to the other sliding member 36, and the swinging bar 321 is connected to a side of the second sliding portion 363 of the corresponding sliding member 36 away from the other sliding member 36 by the second pivot 38. In this embodiment, the second pivot 38 is integrally form with the second sliding portion 363 of the sliding member 36, and a generally U-shaped slot 325 is defined in the end of the swinging bar 321 for accommodating the second pivot 38. In other embodiment, the second pivot 38 may be integrally formed with the swinging bar 321, or may be formed separately and then assembled to the sliding member 36 and the swinging bar 321.

The second stimulation module 40 includes two second motors, which may be vibration motors. As shown in FIG. 2 and FIG. 4, the second motors 40 are arranged in the two stimulation portions 24 of the shell 20, respectively. Preferably, the second motors 40 are arranged at distal ends of the stimulation portions 24, adjacent to but spaced from the stimulation ends 323 of the swinging bars 321 of the first stimulation module 30. During in use, the first stimulation module 30 occludes or slaps the human body, particularly sensitive areas of the human body, and the second motors 40 provide high-frequency vibration to the sensitive areas, thereby different manners of stimulations being provided on the sensitive areas and thus achieving better stimulation effects.

Figure 3:
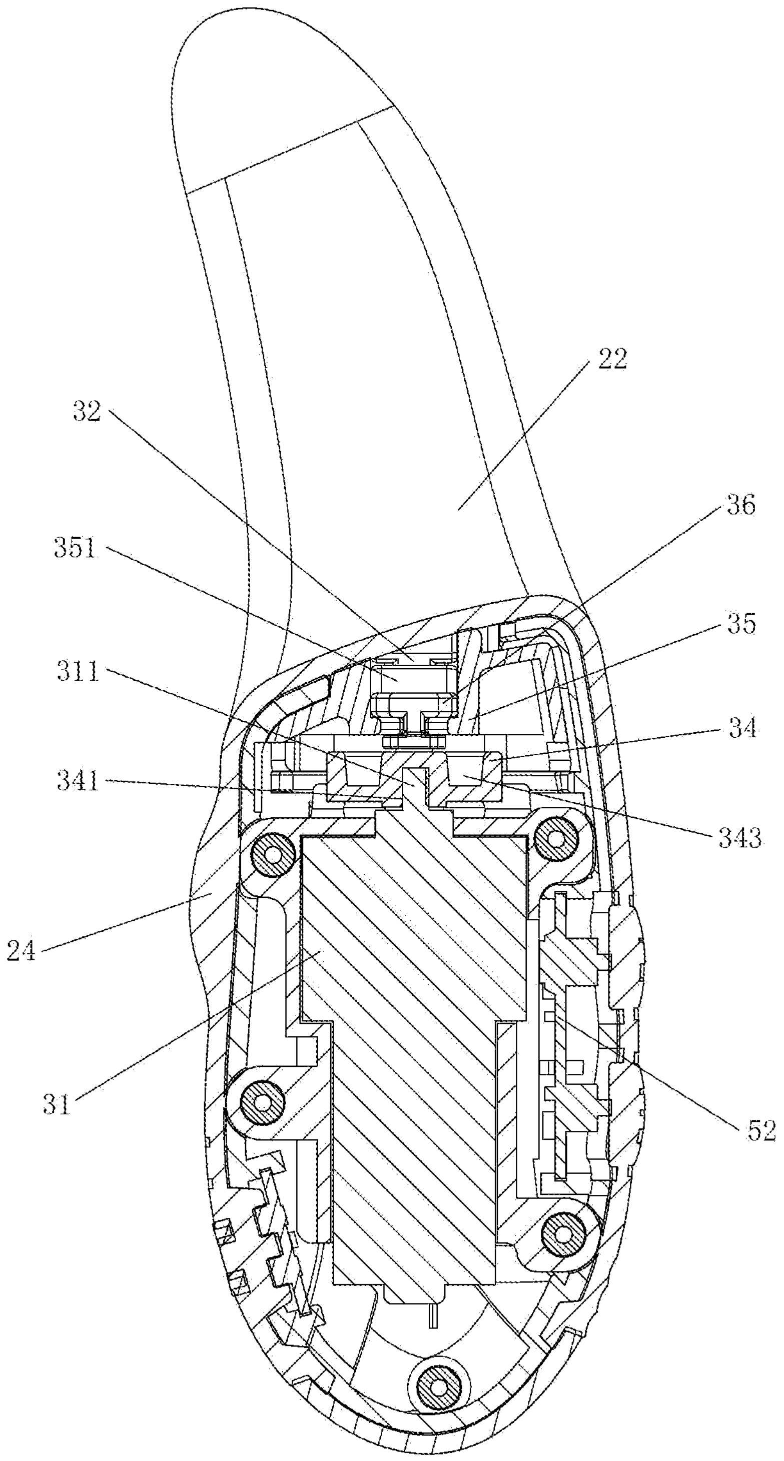
FIG. 3 is another cross sectional view of the stimulation device of FIG. 1.

Referring to FIG. 2 to FIG. 4, a battery 50, preferably a rechargeable battery, is arranged in the shell 20 for supplying electric power to electric components, such as the first and second motors 31, 40 of the stimulation device 100. Further, a control circuit board 52 is mounted in the shell 20 and electrically connected to the first and second motors 31, 40, for controlling their operation according to user's instructions, such as controlling a rotary speed/direction of the first motor 31 and/or a vibration frequency of the second motor 40. It should be understood that the first motor 31/first stimulation module 30 and the second motor/second stimulation module 40 may be started separately or simultaneously.

Figure 7:
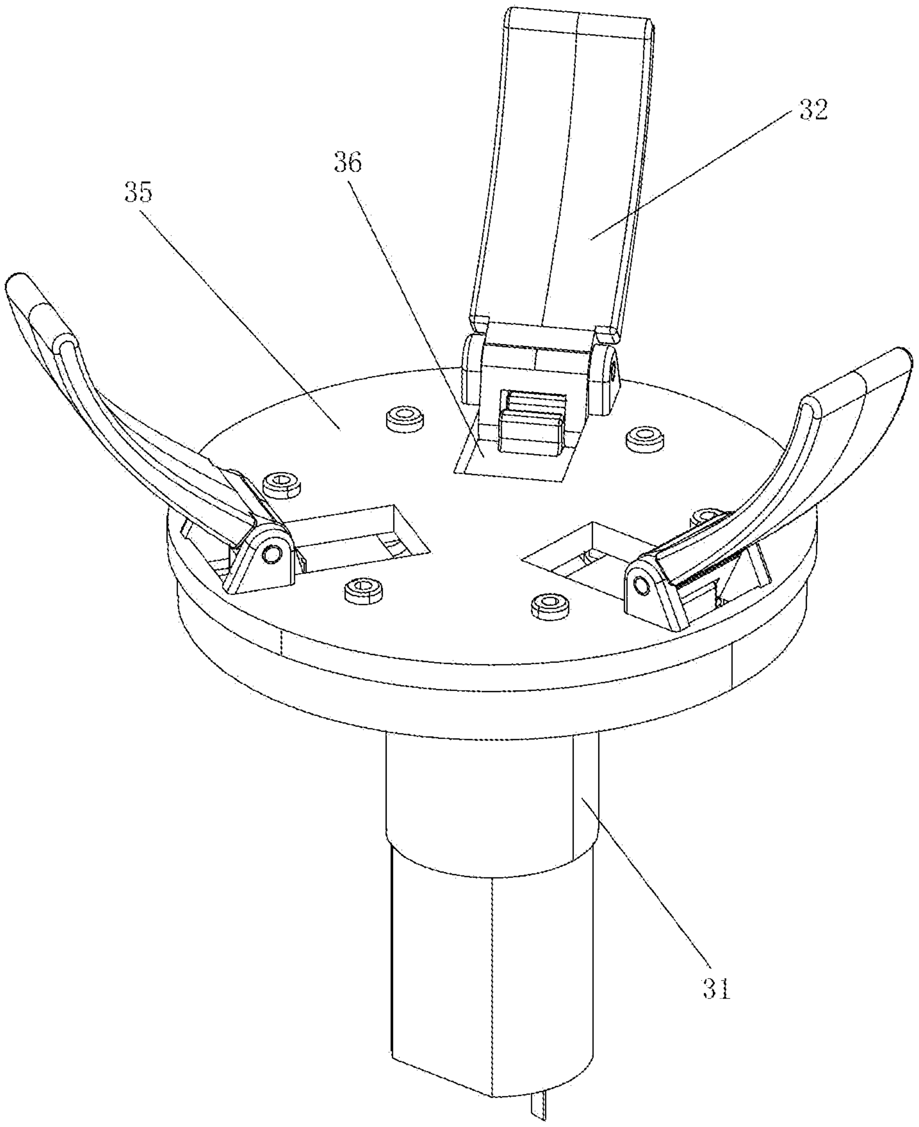
FIG. 7 shows the first stimulation module according to a second embodiment.
Figure 8:
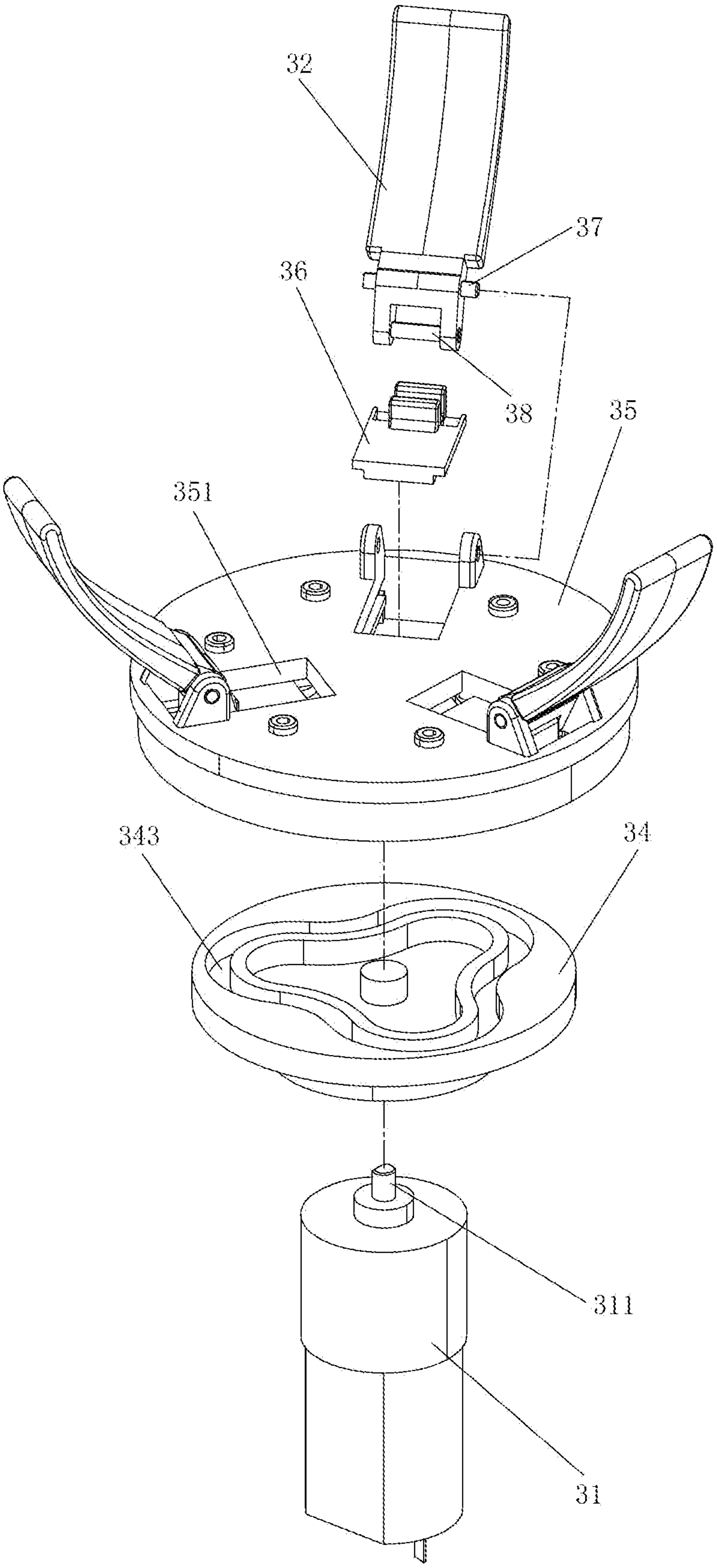
FIG. 8 is an exploded view of the first stimulation module of FIG. 7.
Figure 9:
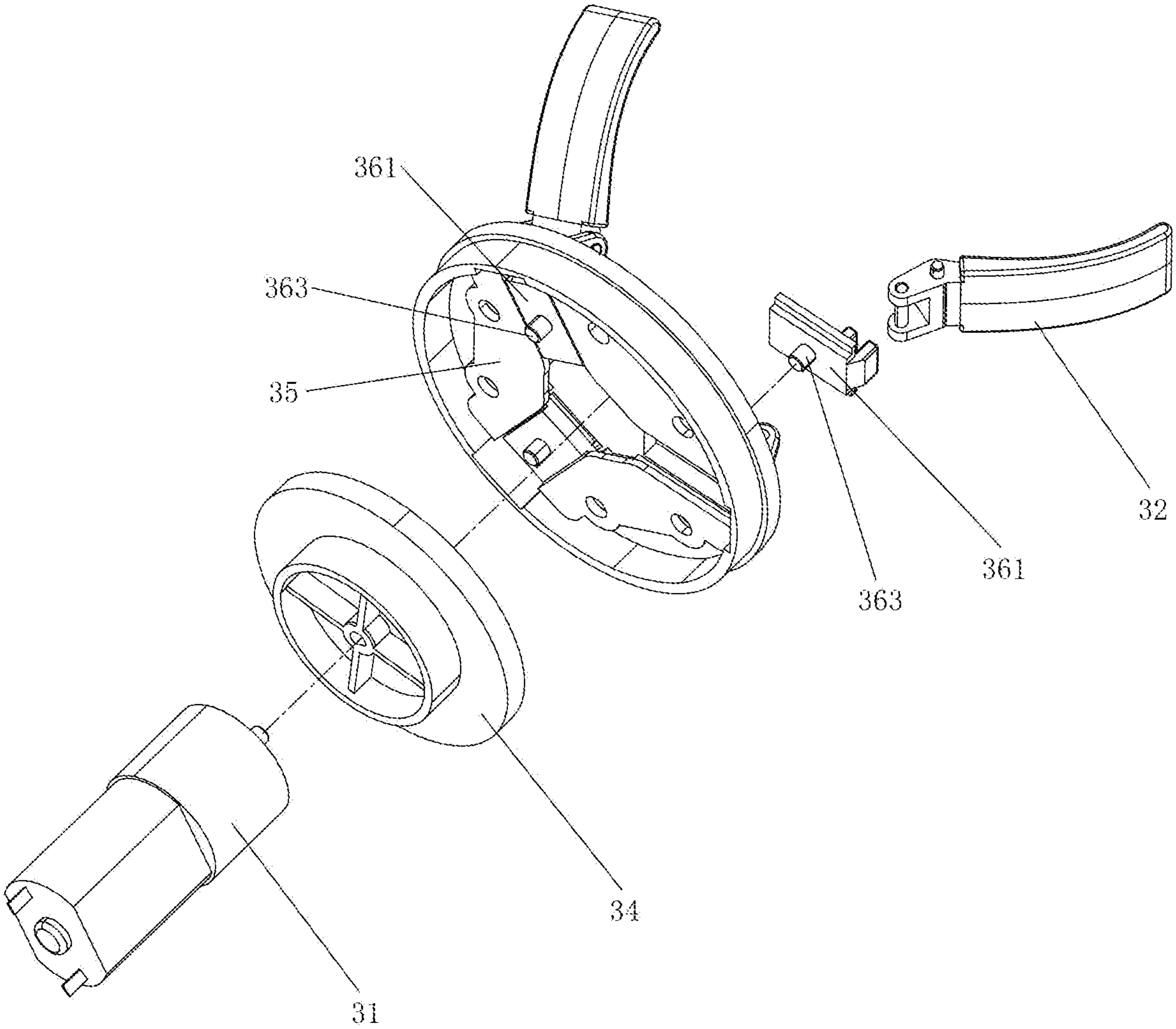
FIG. 9 shows the first stimulation module of FIG. 8 from another aspect.

Referring to FIGS. 7-9, a first stimulation module 30 according to a second embodiment is shown. Similarly, the first stimulation module 30 includes a first motor 31 with a rotary shaft 311, a swinging unit 32 and a transmission unit 33 connected between the rotary shaft 311 of the first motor 31 and the swinging unit 32.

The swinging unit 32 includes a rotary member 34 defining a first groove 343 therein, a fixing member 35 defining several second grooves 351 therein, and several sliding members 36 each having a first sliding portion 361 being sliably engaged into the first groove 343 and a second sliding portion 363 being sliably engaged into one of the second grooves 351. In this embodiment, the first groove 343 is generally annular and triangle-shaped, wherein angles thereof are chamfered. Three second grooves 351 are provided in the fixing member 35, and each second groove 351 extends from a periphery towards a central area of the fixing member 35 along a radial direction.

Correspondingly, three sliding members 36 are provided and engaged into the three second grooves 351, respectively, and three swinging bars 321 are provided and connected to the three sliding members 36, respectively. Each swinging bar 321 is rotatably connected to the fixing member 35 by a first pivot 37 at a middle portion thereof, one end of the swinging bar 321 is rotatably connected to the second sliding portion 363 of the sliding member 36 by a second pivot 38, and another end of the swinging bar 321 is configured as a stimulation end 323 and extends into one of the stimulation portions 24 of the shell 20. Correspondingly, the shell 20 may be formed with three stimulation portions 24 (not shown).

The transmission unit 33 is configured for converting rotation of the first motor 31 into linear reciprocating motion of the sliding members 36 in the radial direction, and in turn driving the swinging unit 32 to swing about the first pivots 37 towards or away from each other, thereby achieving the occlusion action.

Figure 10:
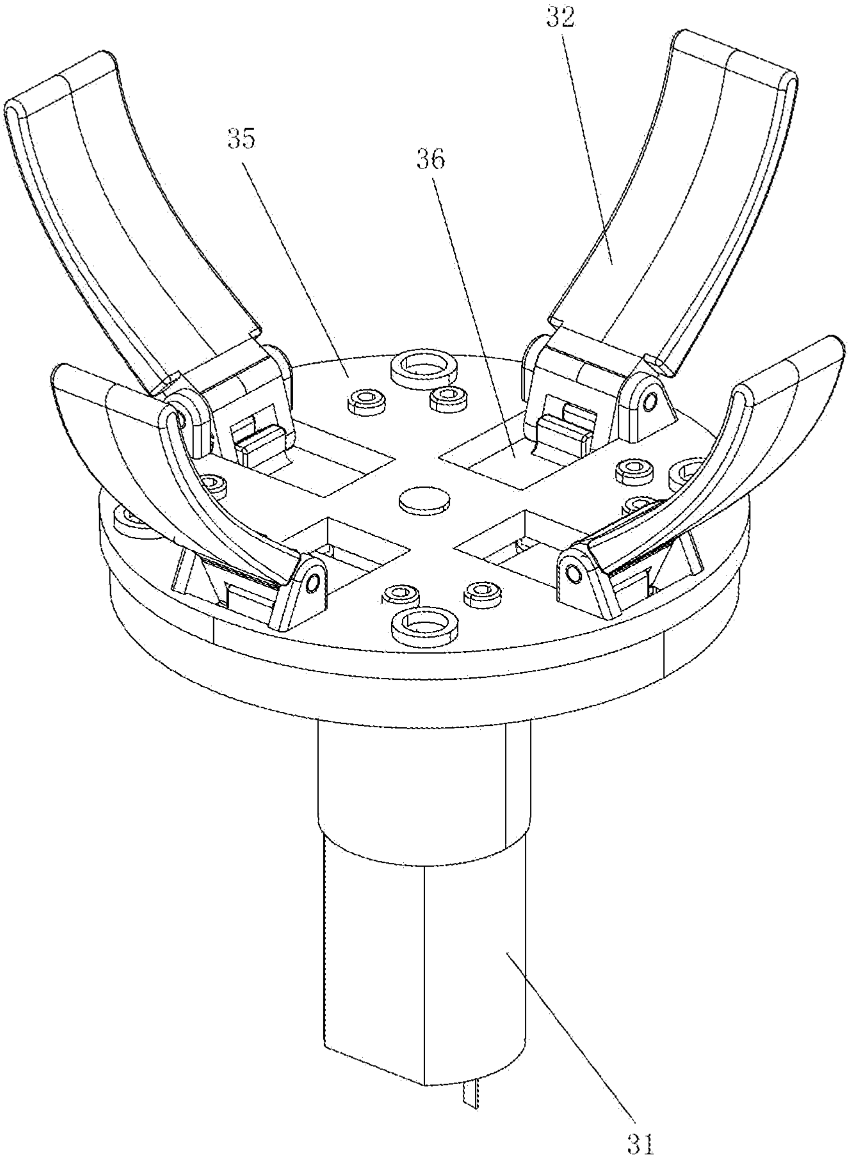
FIG. 10 shows the first stimulation module according to a third embodiment.
Figure 11:
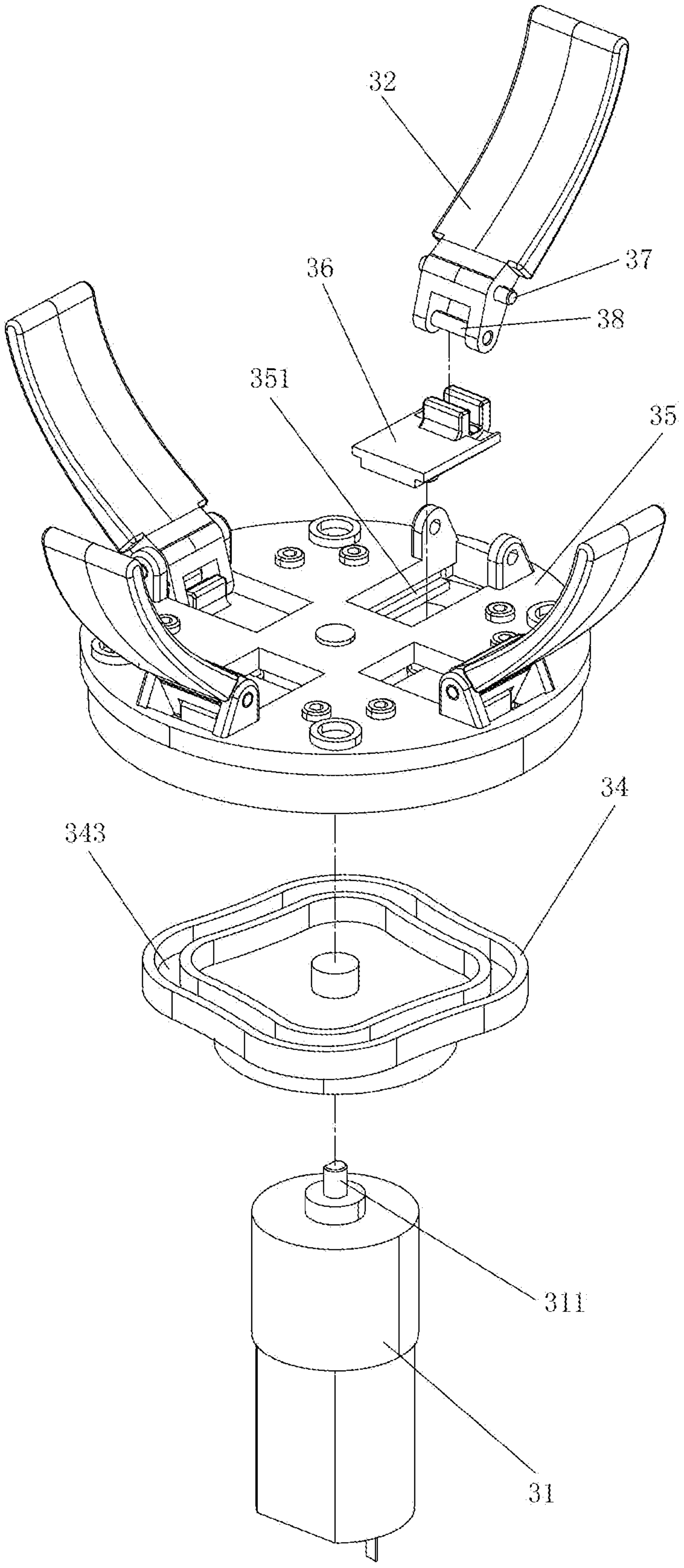
FIG. 11 is an exploded view of the first stimulation module of FIG. 10.
Figure 12:
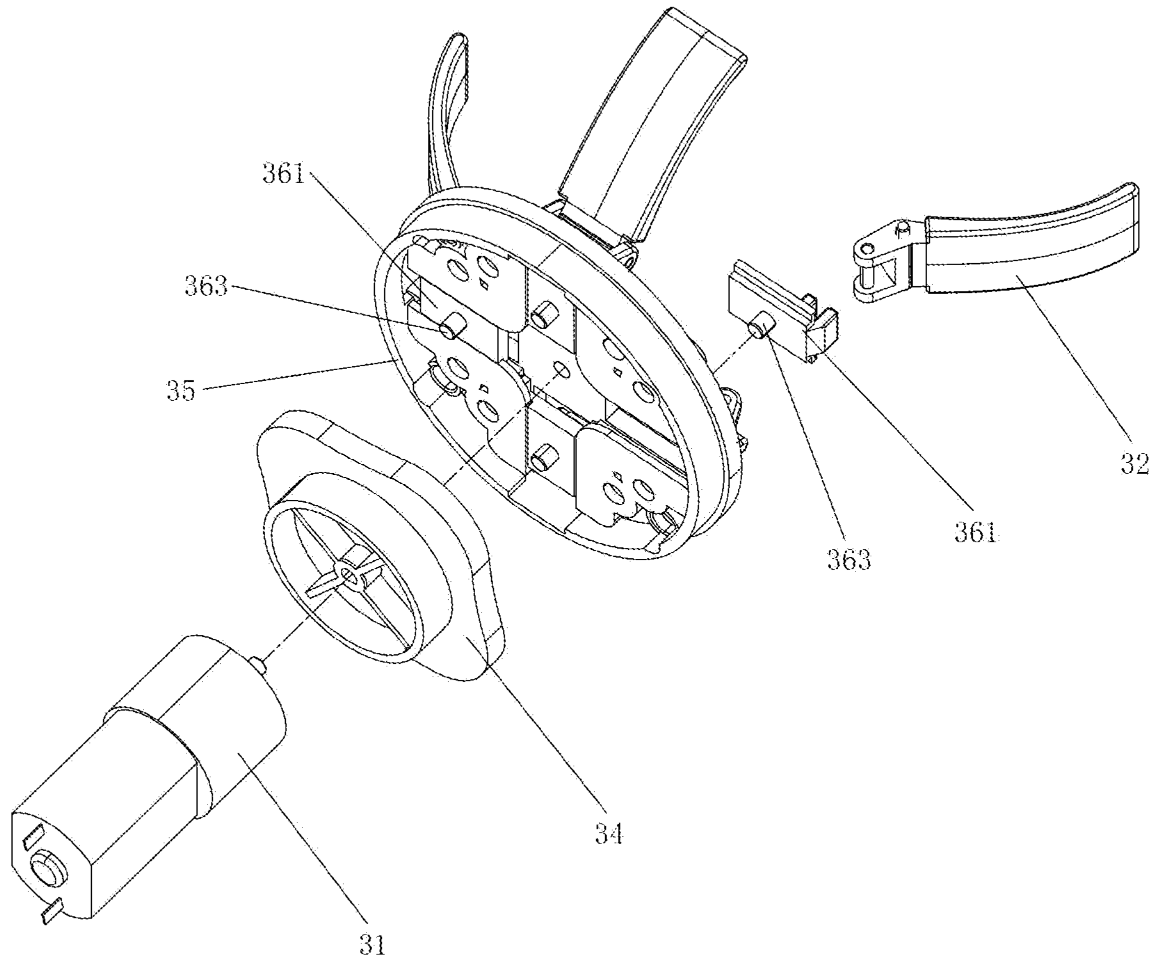
FIG. 12 shows the first stimulation module of FIG. 11 from another aspect.
Figure 13:
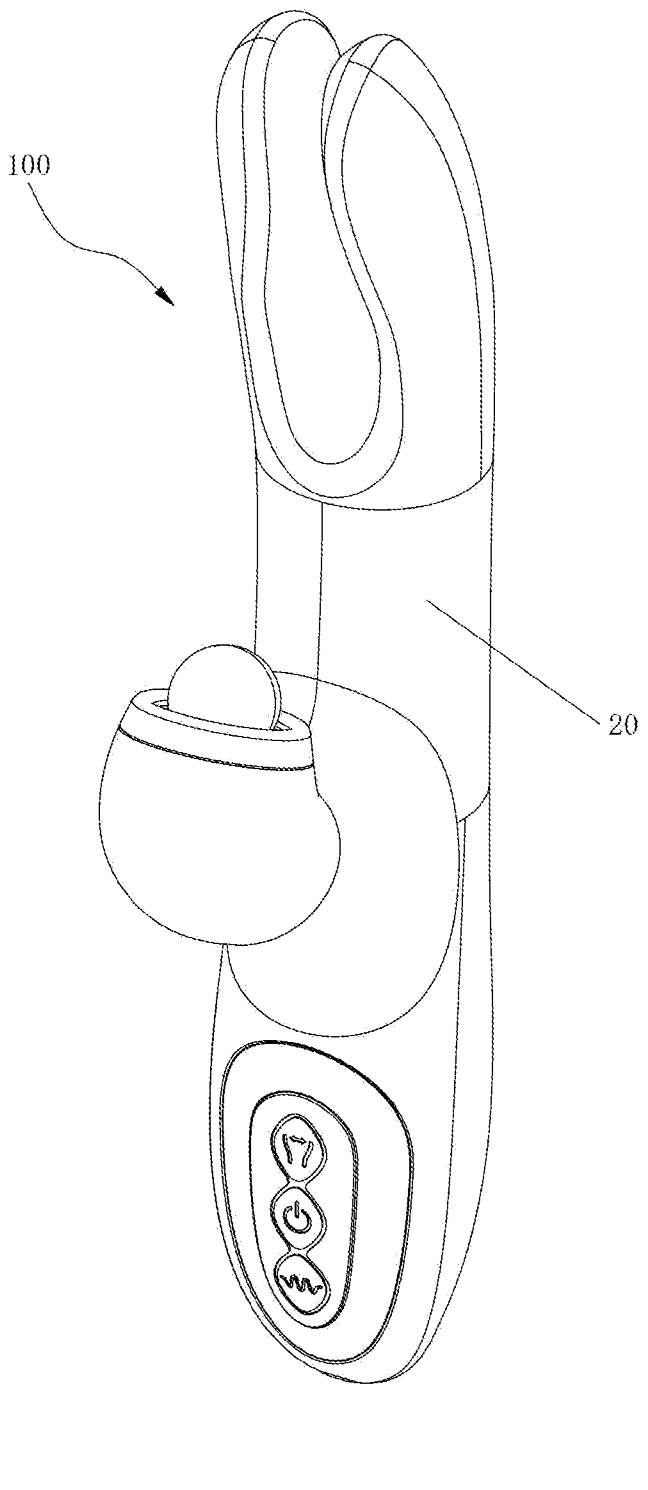
FIG. 13 is an isometric, assembled view of a stimulation device according to a second embodiment of the present application.
Figure 14:
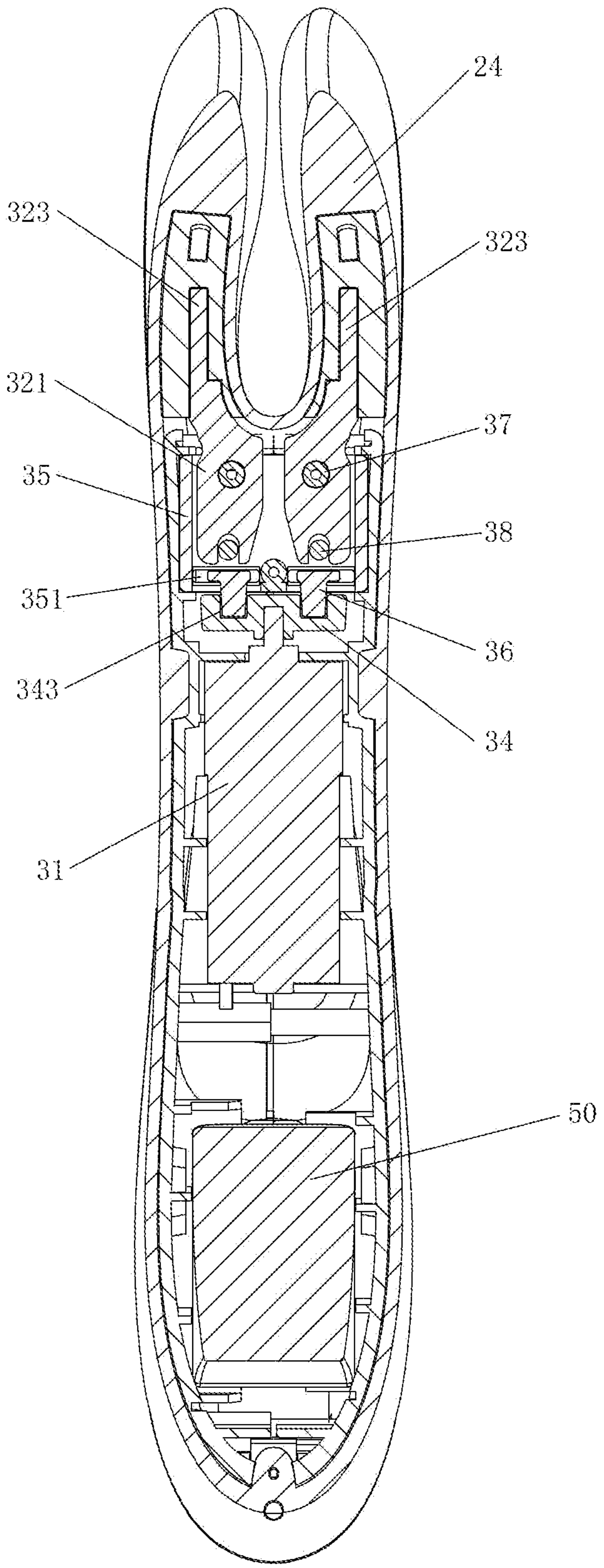
FIG. 14 is a cross sectional view of the stimulation device of FIG. 13.
Figure 15:
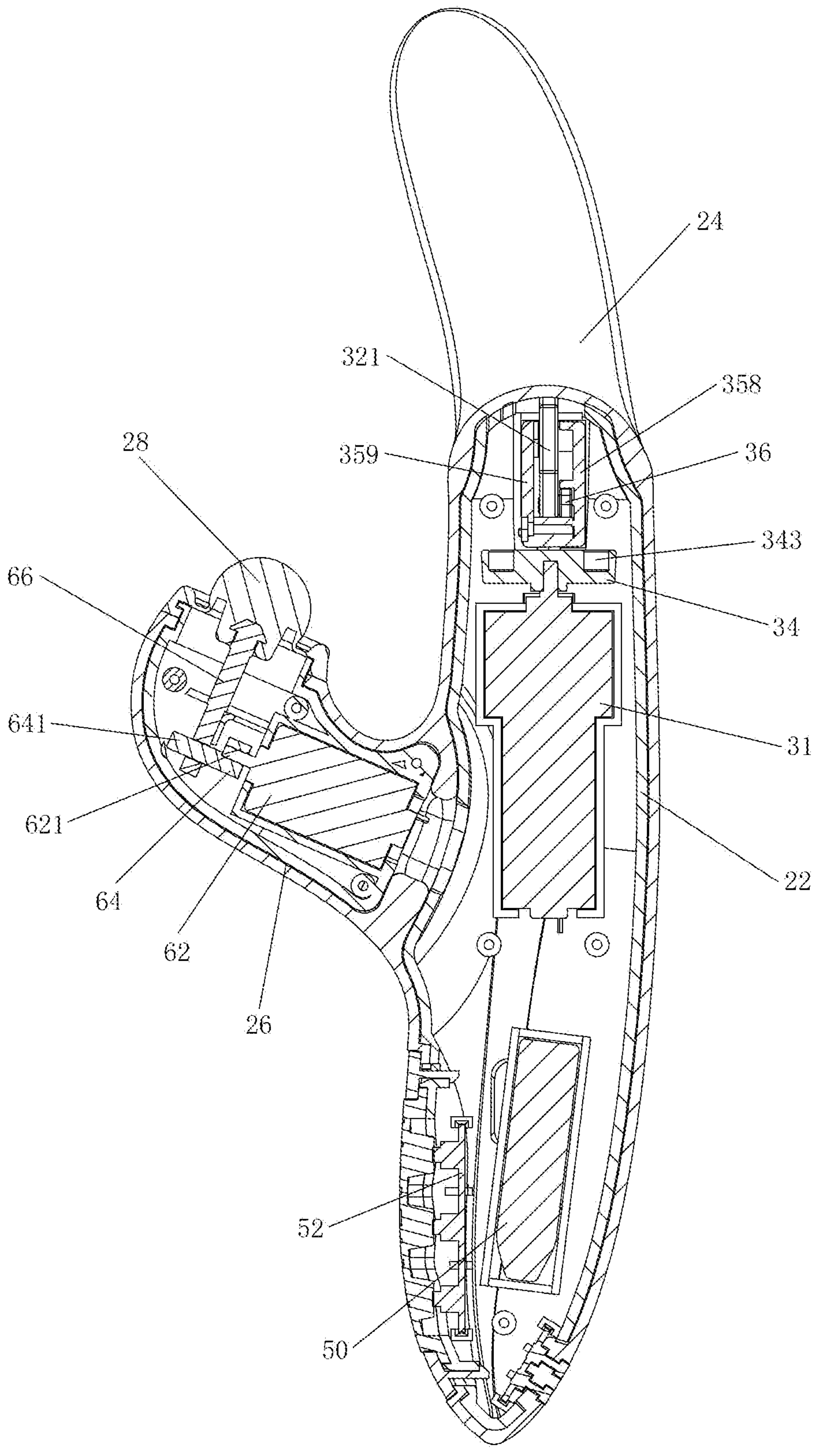
FIG. 15 is another cross sectional view of the stimulation device of FIG. 13.

Referring to FIGS. 10-12, a first stimulation module 30 according to a third embodiment is shown. Similarly, the first stimulation module 30 includes a first motor 31 with a rotary shaft 311, a swinging unit 32 and a transmission unit 33 connected between the rotary shaft 311 of the first motor 31 and the swinging unit 32.

In this embodiment, the swinging unit 32 includes a rotary member 34 defining a first groove 343 therein, a fixing member 35 defining four second grooves 351 therein, and four sliding members 36 each having a first sliding portion 361 being sliably engaged into the first groove 343 and a second sliding portion 363 being sliably engaged into one of the second grooves 351. Correspondingly, four sliding members 36 are provided and engaged into the four second grooves 351, respectively, and four swinging bars 321 are provided and connected to the four sliding members 36, respectively.

In this embodiment, the first groove 343 is generally annular and square-shaped, wherein angles thereof are chamfered. Each second groove 351 extends from a periphery towards a central area of the fixing member 35 along a radial direction. By means of the first groove 343 and the second grooves 351, rotation of the first motor 31 is converted into linear reciprocating motion of the sliding members 36 in the radial direction. In other embodiment, the first groove 343 may be polygonal-shaped, such as pentagon-shaped, hexagon-shaped and the like, or may be flower shaped, such as quincunx-shaped and etc.; and the number of the second grooves 351 and/or sliding members 36 and/or swinging bars 321 may be changed according to the shape of the first grooves 343.

Referring to FIG. 13-19, a stimulation device 100 according to a second embodiment of the present application is shown. In this embodiment, the stimulation device 100 includes an elongated shell 20 and first, second and third stimulation modules 30, 40, 60 mounted in the shell 20.

In this embodiment, the first stimulation module 30 includes a first motor 31, a swinging unit 32, and a transmission unit 33 connected between the first motor 31 and the swinging unit 32. The swinging unit 32 includes two swinging bars 321 being arranged substantially symmetric to each other in the X-direction. The transmission unit 33 includes a rotary member 34 connected to a rotary shaft 311 of the first motor 31, a fixing member 35 and two sliding members 36. The rotary member 34 defines a generally elliptical-shaped first groove 343 in the XY plane, and the fixing member 35 defines a second groove 351 which is elongated in the X-direction.

The two sliding members 36 are arranged substantially symmetric to each other in the X-direction. Each sliding member 36 includes a first sliding portion 361 being sliably engaged into the first groove 343 and a second sliding portion 363 being sliably engaged into the second groove 351. Each swinging bar 321 is rotatably connected to the fixing member 35 by a first pivot 37 at a middle portion thereof, one end of the swinging bar 321 is rotatably connected to the second sliding portion 363 of the sliding member 36 by a second pivot 38, and another end of the swinging bar 321 is configured as a stimulation end 323 and extends into one of the stimulation portions 24 of the shell 20, wherein the first and second pivots 37, 38 both extend along the Y-direction.

The different between this embodiment and the previous embodiment is mainly in the fixing member 35. In this embodiment, the fixing member 35 is generally constructed as a box, and includes a base 358 and a cover 359 connected to each other. Two sides of the fixing member 35 in the Z-direction are opened. The sliding members 36 and the swinging bars 321 are partly received in the fixing member 35, wherein the first sliding portion 361 of the sliding member 36 extends through one open side of the fixing member 35 into the first groove 343, and the stimulation end 323 of the swinging bar 321 extends through another open side of the fixing member 35 into the stimulation portion 24.

Two second grooves 351 are defined in the cover 359, extending along the X-direction and being closed in the Z-direction. The second sliding portion 363 of the sliding member 36 is generally L-shaped, and includes two blocks being perpendicular to each other. The second pivot 38 is perpendicularly connected to one block of the second sliding portion 363, and the first sliding portion 361 extends perpendicularly from another block of the second sliding portion 363 along the Z-direction, wherein the another block of each second sliding portion 363 is slidably engaged into one of the two second grooves 351. In other embodiment, the second groove(s) 351 may be defined in the base 358, or, the base 358 and cover 359 cooperatively define the second groove(s) 351.

During operation, the first motor 31 drives the two sliding members 36 to do linear reciprocating motion in the X-direction, the two swinging bars 321 are forced to swing about the first pivots 37 in opposite directions. The two stimulation portions 24 of the shell 20 swing together with the stimulation ends 323 of the swinging bars 321 of the first stimulation module 30, towards or away from each other, so as to produce an occlusion action to a part of the human body put between the stimulation portions 24, or slap a part of the human body placed around the stimulation portions 24, thereby obtaining better stimulation effects.

Figure 16:
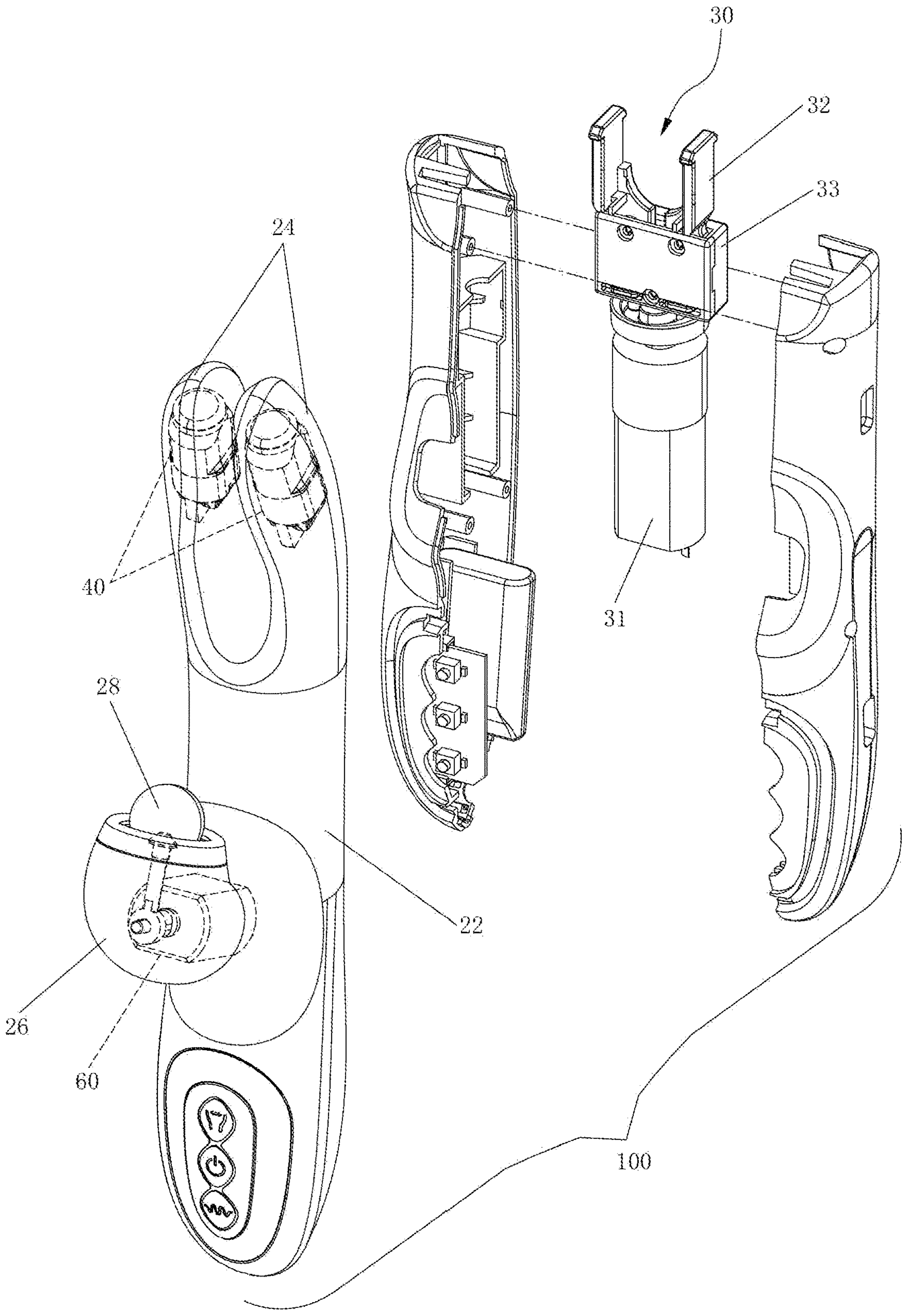
FIG. 16 is an isometric, exploded view of the stimulation device of FIG. 13.
Figure 17:
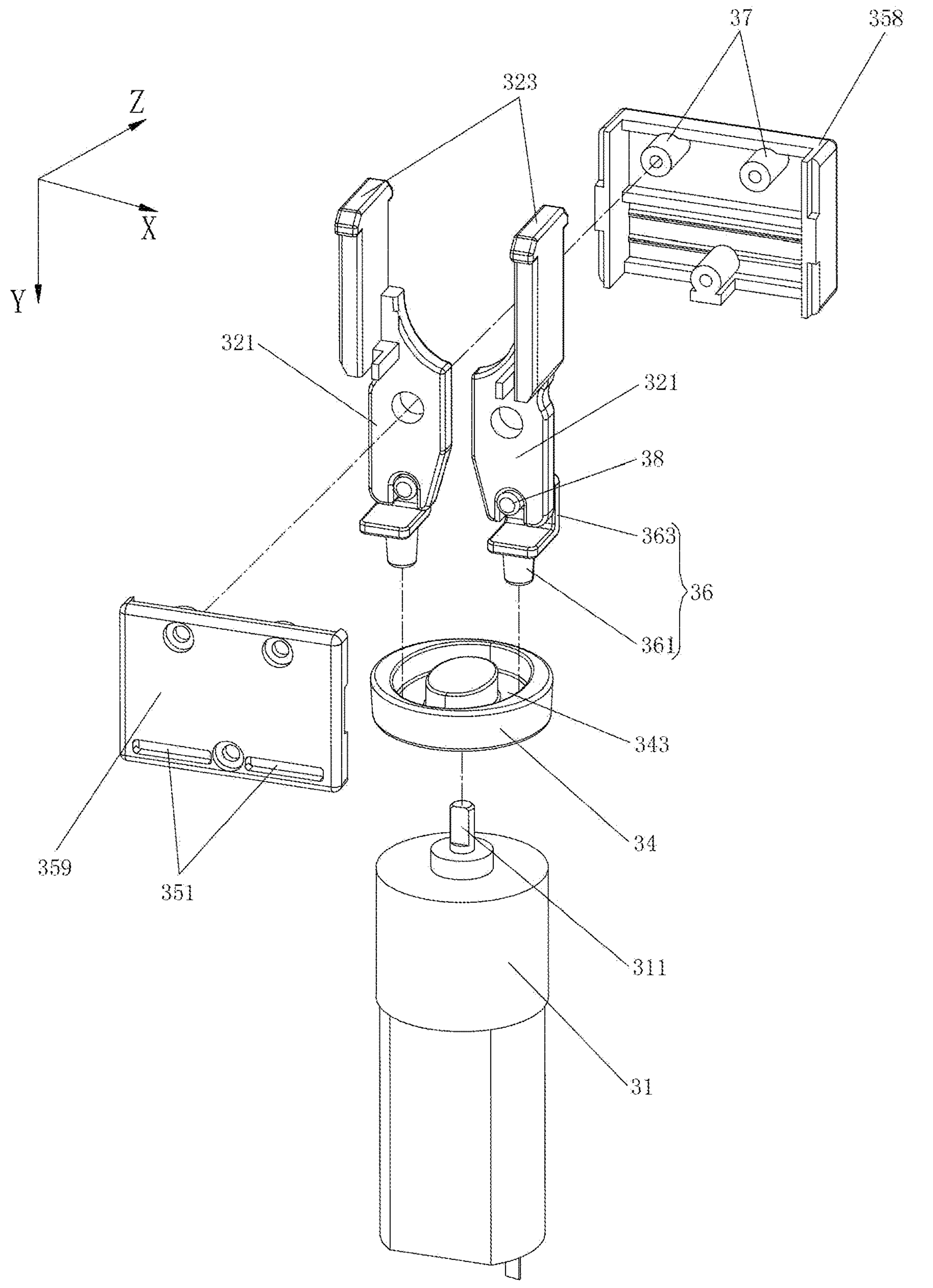
FIG. 17 is a further exploded view of a first stimulation module of the stimulation device of FIG. 13.

As shown in FIG. 16, the second stimulation module 40 includes two second motors, which may be vibration motors and arranged in the two stimulation portions 24 of the shell 20, respectively.

Figure 18:
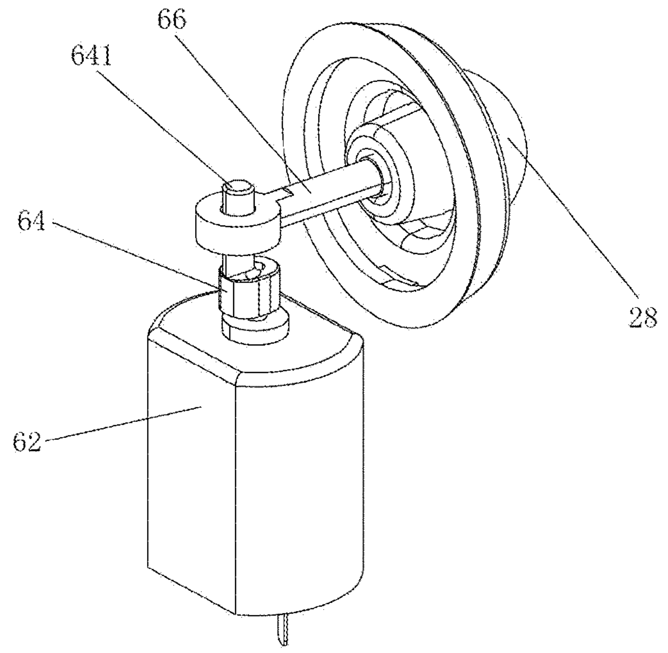
FIG. 18 is a further exploded view of a third stimulation module of the stimulation device of FIG. 13.
Figure 19:
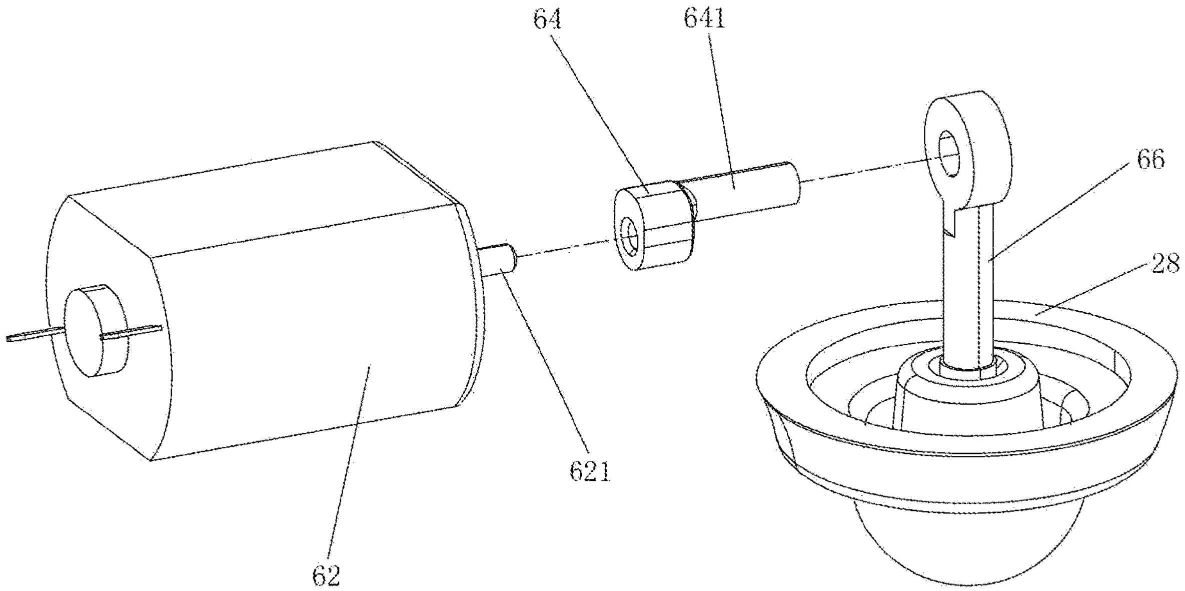
FIG. 19 shows the third stimulation module of FIG. 18 from another aspect.

As shown in FIG. 18 and FIG. 19, the third stimulation module 60 includes a third motor 62 with an output shaft 621, an eccentric wheel 64 connected to the output shaft 621 of the third motor 62, and a stimulation rod66 connected to the eccentric wheel 64. The eccentric wheel 64 has a connecting rod 641 extending out therefrom, and the connecting rod 641 is parallel to the output shaft 621 of the third motor 62. The stimulation rod66 is generally perpendicular to the connecting rod 641, with one end thereof rotatably mounted around the connecting rod 641 and another end thereof embedded into the shell 20.

In this embodiment, a branch 26 extends outwardly and curvedly from the shell 20 to an upper side of a middle of the shell 20 in its longitudinal direction. Preferably, the branch 26 extends integrally from an end of the shell 20 away from the stimulation portions 24. A stimulation head 28 is coupled to a distal end of the branch 26, and the another end of the stimulation rod66 is fixed and embedded in the stimulation head 28. The stimulation head 28 may be formed separately and then assembled to the branch 26, or may be integrally formed with the branch 26 as one piece. That is, the stimulation head 28 may be regarded as a portion of the shell 20, particularly the outer shell 20*a*.

During operation of the third stimulation module 60, rotation of the third motor 62 is converted into revolving of the stimulation rod66 round the output shaft 621, and then converted into linear reciprocating motion of the stimulation rod66 and the stimulation head 28 along an axial direction of the stimulation rod66. During axial movement of the stimulation rod66, a relative rotation is generated between the stimulation rod66 and the connecting rod 641. In this embodiment, the axial direction of the stimulation rod66 extends in the YZ plane, and is angled with the Y-direction and the Z-direction.

The stimulation device 100 of this embodiment may be used in the human body, particularly in women's bodies. For example, the stimulation portions 24 of this stimulation device 100 may be inserted into the vagina with the stimulation head 28 attaching to the clitoris, the stimulation ends 323 of the first stimulation module 30 in the stimulation portions 24 may be driven to swing about the first pivot 37, thereby slapping the vaginal wall, the second motors 40 in the stimulation portions 24 may generate vibration effect to the vaginal wall, and the stimulation rod66 of the third stimulation module 60 in the branch 26 may be driven to flap the clitoris, which can maximize the stimulation effect to the users.

Finally, it should be noted that: the above merely describes preferred embodiments of the present invention without intention to limit the scope of the present invention. Although the present invention has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present invention should be within the scope of the present invention.

What is claimed is:

1. A stimulation device, comprising:

- a rotary member defining a first groove therein, wherein the first groove is annular and non-circular;
- a fixing member defining a second groove therein, wherein the second groove is linear-shaped,
- a sliding member comprising a first sliding portion being slidably engaged into the first groove and a second sliding portion being slidably engaged into the second groove, and
- a swinging unit comprising at least one swinging bar being rotatably connected to the sliding member.

2. The stimulation device according to claim 1, further comprising a shell being provided with at least one stimulation portion and at least one vibration motor accommodated in the at least one stimulation portion, wherein the at least one swinging bar extend into the at least one stimulation portion.

3. The stimulation device according to claim 2, wherein the swinging unit comprises a plurality of swinging bars arranged around the rotary axis of the rotary member, and the plurality of swinging bars are swingable towards each other or away from each other.

4. The stimulation device according to claim 2, wherein the shell comprises a main portion accommodating the rotary member, the fixing member and the sliding member therein, and the at least one stimulation portion comprises a plurality of stimulation portions extending out from the main portion; and wherein the swinging unit comprises a plurality of swinging bars extending into the plurality of stimulation portions, respectively.

5. The stimulation device according to claim 4, wherein the shell in whole is elongated, and the stimulation portions extend out from an end of the shell substantially along a longitudinal direction of the shell, and wherein the stimulation portions are to be inserted into a vagina of the user during in use.

6. The stimulation device according to claim 1, wherein the first groove is symmetric about a rotary axis of the rotary member, and the second groove extends along a radial direction of the first groove.

7. The stimulation device according to claim 6, wherein the first groove is substantially elliptical-shaped, polygonal-shaped, or flower shaped.

8. The stimulation device according to claim 1, wherein the stimulation device is a sexual stimulation device.

9. The stimulation device according to claim 1, wherein the at least one swinging bar is rotatably connected to the sliding member by a first pivot extending along a first direction; the second groove is elongated in a second direction which is angled with the first direction, and the first groove is located in a plane defined by the first direction and second direction.

10. The stimulation device according to claim 9, wherein the at least one swinging bar is rotatably connected to the fixing member by a second pivot, and the second pivot is parallel to the first pivot.

11. The stimulation device according to claim 10, wherein one end of the at least one swinging bar is rotatably connected to the second sliding portion of the sliding member by the first pivot, and another end of the swinging bar is configured as a stimulation end.

12. The stimulation device according to claim 11, wherein the first pivot is integrally formed with the second sliding portion, and a U-shaped slot for accommodating the first pivot is defined in the one end of the at least one swinging bar.

13. The stimulation device according to claim 12, wherein the second sliding portion is substantially block-shaped and received in the second groove, a third groove is defined at a bottom of the second groove of the fixing member with a width in the second direction less than that of the second groove, the first sliding portion extends through the third groove into the first groove.

14. The stimulation device according to claim 13, wherein a position portion extends outwardly from an end of the first sliding portion adjacent to the second sliding portion, and has a width greater than that of the third groove; and wherein a through hole is defined at a middle of the third groove with a diameter greater than the width of the position portion for extending of the position portion therethrough.

15. The stimulation device according to claim 1, wherein the shell in whole is elongated, a first branch extends curvedly from an end of the shell to an upper side of a middle of the shell, and a stimulation module is arranged in the first branch.

16. The stimulation device according to claim 15, wherein a stimulation head is provided at a distal end of the first branch, the stimulation module comprises stimulation rod with one end embedded in the stimulation head and a rotary motor for driving the stimulation head to move along an axial direction of the stimulation rod.

17. The stimulation device according to claim 16, wherein the stimulation module further comprises an eccentric wheel connected between the rotary motor and the stimulation rod, the eccentric wheel comprises a connecting rod being set eccentrically, another end of the stimulation rod is rotatably connected to the connecting rod.

18. The stimulation device according to claim 15, wherein at least one second branch extends outwardly from another end of the shell, and the at least one swinging bar extends into at least one second branch.

19. The stimulation device according to claim 18, wherein at least one vibration motor is mounted inside the at least one second branch.

20. The stimulation device according to claim 18, wherein the first branch is configured to stimulate clitoris, and the second branch is configured to stimulate vaginal wall.

* * * * *